United States Patent
Salomon et al.

(10) Patent No.: US 11,897,999 B2
(45) Date of Patent: Feb. 13, 2024

(54) INSULATION PRODUCT COMPRISING MINERAL FIBERS AND A BINDER

(71) Applicant: SAINT-GOBAIN ISOVER, Courbevoie (FR)

(72) Inventors: Pierre Salomon, Courbevoie (FR); Juliette Slootman, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 16/768,814

(22) PCT Filed: Dec. 4, 2018

(86) PCT No.: PCT/FR2018/053104
§ 371 (c)(1),
(2) Date: Jun. 1, 2020

(87) PCT Pub. No.: WO2019/115912
PCT Pub. Date: Jun. 20, 2019

(65) Prior Publication Data
US 2021/0171703 A1 Jun. 10, 2021

(30) Foreign Application Priority Data
Dec. 11, 2017 (FR) ...................................... 1761933

(51) Int. Cl.
*C08G 59/68* (2006.01)
*C03C 25/1095* (2018.01)
(Continued)

(52) U.S. Cl.
CPC ........ *C08G 59/686* (2013.01); *C03C 25/1095* (2013.01); *C03C 25/36* (2013.01);
(Continued)

(58) Field of Classification Search
None
See application file for complete search history.

(56) References Cited

U.S. PATENT DOCUMENTS 3,676,094 A 7/1972 Russell
3,787,220 A * 1/1974 Maher ..................... C08L 63/00
106/209.1

(Continued)

FOREIGN PATENT DOCUMENTS

EP 0 369 848 A1 5/1990
EP 3 133 116 A1 2/2017
(Continued)

OTHER PUBLICATIONS

Partial translation of JP 2017-082374A, USPTO, Translation services. (Year: 2023).*

(Continued)

*Primary Examiner* — Randy P Gulakowski
*Assistant Examiner* — Ha S Nguyen
(74) *Attorney, Agent, or Firm* — Pillsbury Winthrop Shaw Pittman LLP (57) ABSTRACT

An insulation product includes mineral fibers and a binder obtained by curing a binding compound, includes as components a) compounds including at least one epoxy function, including at least one epoxy precursor chosen from aliphatic compounds including at least two epoxy functions, b) a hardener chosen from compounds including at least two reactive functions chosen from hydroxyl and carboxylic acid functions, it being possible for the carboxylic acid function(s) to be in salt or anhydride form.

14 Claims, 1 Drawing Sheet

(51) Int. Cl.

| | |
|---|---|
| *C03C 25/36* | (2006.01) |
| *C08G 59/32* | (2006.01) |
| *C08G 59/42* | (2006.01) |
| *C08G 59/60* | (2006.01) |
| *C08K 7/14* | (2006.01) |
| *C03B 7/04* | (2006.01) |
| *C03B 37/04* | (2006.01) |

(52) U.S. Cl.
CPC ......... *C08G 59/32* (2013.01); *C08G 59/4207* (2013.01); *C08G 59/60* (2013.01); *C08K 7/14* (2013.01); *C03B 37/04* (2013.01)

(56) References Cited

U.S. PATENT DOCUMENTS

| | | | |
|---|---|---|---|
| 6,171,654 B1 | 1/2001 | Salsman et al. | |
| 2004/0034154 A1* | 2/2004 | Tutin | C03C 25/328 524/538 |
| 2009/0281273 A1* | 11/2009 | Kurata | H01B 3/40 528/332 |
| 2010/0155122 A1* | 6/2010 | Okabe | C07D 405/14 528/421 |
| 2010/0280191 A1* | 11/2010 | Dixit | C08G 59/42 525/523 |
| 2013/0095719 A1 | 4/2013 | Deller et al. | |

FOREIGN PATENT DOCUMENTS

| | | | | |
|---|---|---|---|---|
| EP | 3133116 A1 | * | 2/2017 | ............ C03C 25/14 |
| GB | 1210098 A | | 10/1970 | |
| JP | 2008-138061 A | | 6/2008 | |
| JP | 2010-150298 A | | 7/2010 | |
| JP | 2016-537524 A | | 12/2016 | |
| JP | 2017-082374 A | | 5/2017 | |
| JP | 2017082374 A | * | 5/2017 | |
| JP | 2017-514008 A | | 6/2017 | |
| RU | 2092505 C1 | | 10/1997 | |
| RU | 2377263 C2 | | 12/2009 | |
| WO | WO 03/104284 A2 | | 12/2003 | |
| WO | WO 2004/007395 A2 | | 1/2004 | |
| WO | WO 2004/085729 A1 | | 10/2004 | |
| WO | WO 2005/044750 A1 | | 5/2005 | |
| WO | WO-2013057432 A1 | * | 4/2013 | ............ C03C 25/24 |
| WO | WO 2015/033084 A1 | | 3/2015 | |
| WO | WO-2015160216 A1 | * | 10/2015 | ............ C03C 25/14 |

OTHER PUBLICATIONS

International Search Report as issued in International Patent Application No. PCT/FR2018/053104, dated Apr. 23, 2019.
Office Action as issued in Indian Patent Application No. 202017021968, dated Oct. 23, 2020.
Office Action and Search Report as issued in Russian Patent Application No. 2020121647, dated Nov. 23, 2021.
Notice of Reasons for Rejection as issued in Japanese Patent Application No. 2020-529529, dated Nov. 1, 2022.

* cited by examiner

INSULATION PRODUCT COMPRISING MINERAL FIBERS AND A BINDER

CROSS-REFERENCE TO RELATED APPLICATIONS

This application is the U.S. National Stage of PCT/FR2018/053104, filed Dec. 4, 2018, which in turn claims priority to French patent application number 1761933 filed Dec. 11, 2017. The content of these applications are incorporated herein by reference in their entireties.

The present invention relates to an insulation product, in particular a thermal or acoustic insulation product, comprising mineral fibers and a binder, obtained by curing and/or crosslinking a binding compound containing an epoxy precursor and a hardener. The invention also relates to an aqueous binding compound and to a process for producing the insulation product.

The mineral fibers may be glass or rock fibers.

The insulation products may be in the form of mineral wool, of felt or of net comprising glass yarns.

The insulation products are preferably in the form of mineral wool. Mineral wool comprises entangled mineral fibers optionally bound by a binder. These fibers are generally obtained by processes of centrifugation, either internal (in a member referred to as a plate), or external (on members referred to as rotors), combined with stretching by a gas stream at more or less high temperature. They can also be obtained by essentially aeraulic processes of stretching, by gas streams, of a molten mineral material from a bushing. Mineral wool fibers are discontinuous, as opposed to "textile" glass fibers resulting from filaments continually stretched under a bushing.

Thin felts with acoustic insulation or filtering properties can also be obtained with these discontinuous fiber processes.

The nets comprising glass yarns may be woven or non-woven nets. The glass yarns comprise glass fibers derived from continuous yarns (or glass filaments) where appropriate cut and converted. These fibers are obtained by a process of spinning by stretching, in which the molten glass is converted into a filament by being stretched at high speed.

The manufacture of mineral wool-based insulation products generally comprises:
  a step of manufacturing the glass or rock fibers, for example by a centrifugation process,
  a step of applying an aqueous binding compound,
  a step of collecting fibers on a belt so as to form a web or a mat,
  a thermosetting step at temperatures greater than 100° C. in an appropriate heating device such as a drying oven.

The aqueous binding compound is vaporized on the still-hot fibers at the level of the fiberizing member and/or during their path between the fiberizing device and the fiber collecting belt.

The resulting insulation product comprises mineral wool, the fibers of which are bonded to one another by a binder obtained by curing the components of the binding compound. The binder must adhere correctly to the fibers and must be distributed homogeneously in order to subsequently be preferentially at the points of juncture between the fibers. The binding compound is therefore preferably sprayed when the fibers are still individualized. Consequently, the spraying is carried out in a fiber collection hopper, below burners generating a stretching gas stream. As a result, the use of flammable and/or polluting organic compounds is prohibited, since the risk of fire and/or pollution in the collection hopper is too great.

Furthermore, the aqueous binding compound undergoes successive dilution before being applied to the fibers. These components must be able to be uniformly distributed within the binding compound regardless of the level of dilution and of stirring.

Phenolic resins conventionally used as binders are being increasingly replaced with products which emit no, or very little, formaldehyde, which is a compound that is deemed to be able to harm human health.

The applicant has proposed, in its applications EP 0 369 848, WO 2004/007395 and WO 2005/044750, binding compounds comprising an amine hardener and epoxy precursor-based resins chosen from polyglycidyl ethers.

The epoxy precursor and the hardener must not react before application to the fibers and forming of the insulation product. This means that the pre-crosslinking must be as weak as possible. This is because if the epoxy precursor and the hardener polymerize in the storage tanks or at the level of the spray rings, this brings about painstaking cleaning but especially the interruption of production.

Preferably, the epoxy precursor and the hardener must not react after spraying and before collection of the fibers in the form of mats. Even more preferably, the epoxy precursor and the hardener must not react before passing through the appropriate heating device. Finally, the epoxy precursor and the hardener must react rapidly during the thermosetting reaction in the heating device.

It is therefore necessary to perfectly control the beginning and the rate of polymerization. The risks of pre-crosslinking are thus avoided and it is possible for the polymerization time to remain compatible with high production rates, in particular by making sure that the binder is completely cured after the treatment in the drying oven at high temperature.

The resins disclosed in applications EP 0 369 848, WO 2004/007395 and WO 2005/044750 are dispersible or capable of being emulsified in the presence of an emulsifying agent or of a dispersing agent. The only resins exemplified in these applications are polyglycidyl ethers obtained by condensation of epichlorohydrin and bisphenol.

The use of resins obtained from compounds suspected of being endocrine disrupters, such as bisphenol, is not entirely satisfactory.

Furthermore, resins based on polyglycidyl ethers of bisphenol are not water-soluble. These resins are used in binding compounds in emulsion form. However, the use of emulsion in an industrial process comprising large-scale dilution steps and high-temperature injection steps can be problematic. This is because it is necessary to guarantee the stability of the emulsion at each step of the process in order to guarantee the reproducibility of the resulting insulation products.

The hardeners used in application WO 2005/044750 are aliphatic polyamines such as diethylenetriamine (DETA), triethylenetetramine (TETA) or tetraethylenepentamine (TEPA). These compounds are capable of reacting significantly at temperatures below 100° C., or even at ambient temperature with certain epoxy precursors. Furthermore, since the reaction is exothermic, the probability of reaction between hardener and epoxy precursor once the reaction has been initiated increases exponentially.

The binding compounds of the prior art comprising an epoxy resin in emulsion form and such amine hardeners meet the requirements of polymerization, namely nonpolymerization before spraying and polymerization after spraying in the fiber collection hopper, since the resins are in emulsion form. The epoxy functions are not directly accessible as long as the emulsion remains stable. On the other hand, as soon as the water is injected and therefore has evaporated, the reactive functions of the hardener and the epoxy functions of the resin can react together. The reactivity of the amine hardeners with respect to the epoxy functions enables rapid curing compatible with industrial production rates. However, the reaction generally begins as soon as spraying takes place and not during the curing step in the appropriate heating device.

There is a need to develop new epoxy resin-based binding compounds which do not have the drawbacks of the prior art.

The invention proposes to provide a binding compound of which:
the epoxy precursors are not obtained from compounds suspected of being endocrine disrupters such as bisphenols, and/or
some or all of the compounds are derived or produced from natural (biobased) products, and/or
the epoxy precursors are perfectly water-soluble or water-miscible and therefore are not in the form of an emulsion in the binding compound, and/or
the binding compound does not polymerize or polymerizes very little before injection into the fiber collection hopper, that is to say:
  for a sufficient period of time corresponding to the normal storage times in the tanks before injection, in particular for several hours, and at temperatures capable of being reached during these storage and injection steps, and/or
the binding compound does not polymerize or polymerizes very little before passing through the appropriate heating device, and/or
the binding compound polymerizes rapidly at the time it passes through the appropriate heating device.

The invention relates to an insulation product comprising mineral fibers and a binder obtained by curing a binding compound comprising as components:
a) compounds comprising at least one epoxy function, including at least one epoxy precursor chosen from aliphatic compounds comprising at least two epoxy functions, the aliphatic compounds comprising at least two epoxy functions representing at least 50% of the total weight of the compounds comprising at least one epoxy function of the binding compound,
b) a hardener chosen from compounds comprising at least two reactive functions chosen from hydroxyl and carboxylic acid functions, it being possible for the carboxylic acid function(s) to be in salt or anhydride form.

The invention also relates to an aqueous binding compound for insulation products based on mineral fibers, comprising as components other than water:
a) compounds comprising at least one epoxy function, including at least one epoxy precursor chosen from aliphatic compounds comprising at least two epoxy functions, the aliphatic compounds comprising at least two epoxy functions representing at least 50% of the total weight of the compounds comprising at least one epoxy function of the binding compound,
b) a hardener chosen from compounds comprising at least two reactive functions chosen from hydroxyl and carboxylic acid functions, it being possible for the carboxylic acid function(s) to be in salt or anhydride form.

The invention also relates to a process for manufacturing an insulation product comprising mineral fibers and a binder, wherein:
an aqueous binding compound according to the invention is applied to the mineral fibers,
a binder is formed by thermal curing of the nonvolatile components of the binding compound.

Such binding compounds are simple to prepare, stable and highly dilutable and exhibit curing conditions compatible with the intended applications.

In the remainder of the description, the features described apply without distinction to the binding compound, to the insulation product and to the process for manufacturing the insulation product.

The applicant has discovered that certain epoxy precursors according to the invention, obtained from the aliphatic compounds, contrary to the epoxy precursors obtained from aromatic compounds of bisphenol type, are completely water-soluble. Contrary to emulsions, solutions are more simple to prepare and their use poses few problems. Any problems linked to the stability of emulsions are dispensed with.

However, the use of certain amine hardeners cannot in this case be envisioned by virtue of the fact that they are too highly reactive with respect to the epoxy functions of the precursors. These functions are directly accessible since they are no longer now "protected" by the emulsion.

Application WO 2005/044750 mentioned above specifies that the epoxy precursor may be chosen from the resins resulting from the reaction between epichlorohydrin and bisphenol A, bisphenol F, polyethylene glycols, glycerol, pentaerythritol and novolac resins and mixtures of these resins. The resins formed by reaction between epichlorohydrin and bisphenol A are particularly preferred and the only ones exemplified. Application WO 2005/044750 also specifies that other epoxy compounds, such as epoxidized aliphatic compounds, can be used. The content of these compounds generally represents less than 30%, preferably less than 10% of the weight of the epoxy resin.

No example illustrates a binding compound comprising epoxidized aliphatic compounds. Application WO 2005/044750 does not disclose a binding compound comprising, relative to the total weight of the compounds comprising at least one epoxy function present in the binding compound, at least 50% by weight of aliphatic compounds comprising at least two epoxy functions.

The conditions for polymerization, beginning and rate of polymerization, of a binding compound comprising, as epoxy precursor, polyglycidyl ethers of aliphatic compounds in solution, and, as hardener, aliphatic polyamines are not controllable under the conditions of the intended application. This is because these compounds are capable of reacting before injection into the fiber collection hopper. Indeed, the crosslinking temperature is below 90° C., or even close to ambient temperature for the most reactive polyamines. The risk of polymerization in the storage tanks or in the injection rings is too high. Furthermore, the risk of crosslinking before application to the fibers increases the risk of obtaining insulation products of variable quality.

Figure 1:
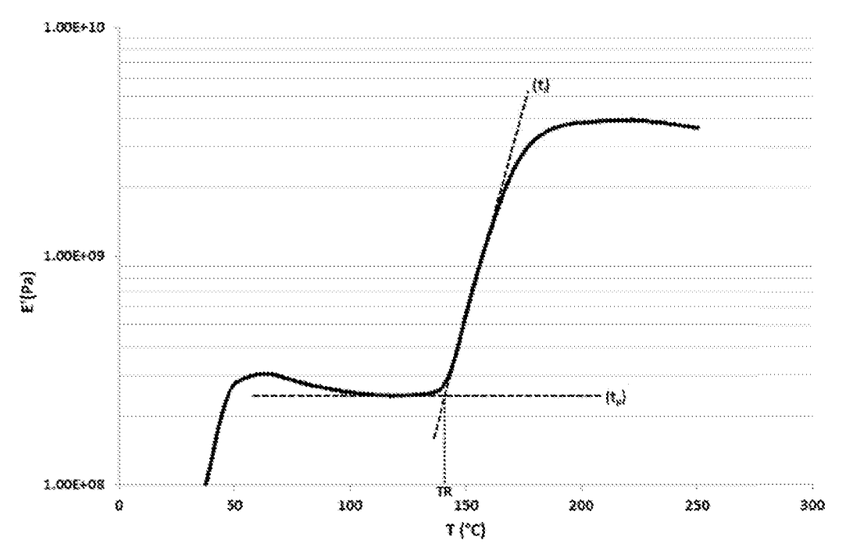
FIG. 1 shows the variation in elastic modulus E' (in Pa) as a function of temperature (in ° C).

According to the invention, the crosslinking temperature is determined by dynamic mechanical analysis (DMA). DMA makes it possible to determine the viscoelastic nature of a polymer. A microfiber filter is impregnated with the binding compound and held horizontally between fixed jaws. An oscillating element applied against the upper face of the sample, and fitted with a device for measuring the stress as a function of the strain applied, makes it possible to calculate the elastic modulus E'. The impregnated filter paper is heated to 250° C., starting from 25° C. at the rate of 4° C./min. From the measurements, the curve of the variation in elastic modulus E' (in Pa) as a function of temperature (in ° C.) is plotted. Such a curve is represented in FIG. 1. The tangents to the plateau before crosslinking ($t_p$) and to the point of inflection ($t_1$) are then plotted. The crosslinking temperature (TR) corresponds to the temperature at the intersection of the tangents to the plateau before crosslinking ($t_p$) and to the point of inflection ($t_1$).

For these measurements, the aqueous binding compounds deposited on the filter have a solids content of 10% to 50%, preferably of approximately 30%.

The binding compound according to the invention has, in increasing order of preference, a crosslinking temperature greater than or equal to 90° C., greater than 100° C., greater than 110° C. or between 90 and 200° C. This means that the components (a) and (b) have, in increasing order of preference, a crosslinking temperature determined by dynamic mechanical analysis with a heating rate of 4° C./min, of greater than or equal to 90° C., greater than 100° C., greater than 110° C. or between 90 and 200° C.

The crosslinking or curing reaction may be exothermic.

The hardeners used according to the invention, in particular of polycarboxylic acid or polyol type, react selectively as a function of the temperature with the epoxy precursors comprising aliphatic compounds.

Indeed, the following are observed:
a quasi-inertness when the temperature is below a threshold temperature, said threshold temperature allowing the injection of the fibers into the collection hopper without curing,
great reactivity as soon as the threshold temperature is reached, allowing rapid crosslinking.

The threshold temperature and the crosslinking kinetics are therefore compatible with the process for manufacturing insulation products based on mineral wool.

Consequently, the invention advantageously provides a binding compound of which the epoxy precursor can be in solution and not in an emulsion by virtue of the choice of a hardener which reacts selectively only after injection into the fiber collection hopper and preferably only in the heating device.

Preferably, the aqueous binding compound is in the form of a solution. This means that all the components of the composition are water-soluble.

The binding compound comprises at least one epoxy precursor chosen from aliphatic compounds comprising at least two epoxy functions.

According to the invention, the term "aliphatic compound" is intended to mean a compound which does not comprise an aromatic group. An aliphatic compound is a noncyclic or cyclic, linear or branched, saturated or unsaturated, carbon-based organic compound optionally comprising other atoms such as oxygen, nitrogen or sulfur, with the exclusion of aromatic compounds.

The epoxy precursor based on an aliphatic compound comprising at least two epoxy functions has an EEW (Epoxy Equivalent Weight) value of between 50 and 1000, preferably between 100 and 300. The epoxide equivalent (EE) weight is the amount of epoxy precursors in grams containing one equivalent of epoxides.

Preferably, the epoxy precursors may be biobased.

Preferably, the epoxy precursors are water-soluble or water-miscible. This means that the mixture of the epoxy precursor and the water is in the form of a homogeneous solution, as opposed to a heterogeneous dispersion or mixture such as an emulsion. This means that the mixture of the epoxy precursor and the water is free of surfactants. Thus, the epoxy precursors according to the invention can be free of surfactants.

The aliphatic compounds comprising at least two epoxy functions represent, by weight of the total weight of the compounds comprising at least one epoxy function of the binding compound, in increasing order of preference, at least 50%, at least 60%, at least 70%, at least 80%, at least 90%. In this case, the term "compound comprising at least one epoxy function", unless otherwise indicated, includes aliphatic or aromatic compounds comprising at least one epoxy function.

The aliphatic compounds comprising at least two epoxy functions represent, by weight of the total weight of the epoxy precursors comprising at least two epoxy functions, in increasing order of preference, at least 50%, at least 60%, at least 70%, at least 80%, at least 90%, at least 95%, at least 98%, 100%. In this case, the term "epoxy precursor comprising at least two epoxy functions", unless otherwise indicated, includes aliphatic or aromatic compounds comprising at least two epoxy functions.

The epoxy precursor based on an aliphatic compound comprising at least two epoxy functions may be:
a polyglycidyl ether of an aliphatic polyol,
an aliphatic poly-epoxy compound obtained by oxidation of an aliphatic compound comprising at least two double bonds.

The polyglycidyl ether of an aliphatic polyol may be obtained by reaction of epichlorohydrin with an aliphatic polyol. The epichlorohydrin and the aliphatic polyol may be biobased.

The aliphatic polyol can be chosen from:
glycerol,
polyglycerols,
inositol,
hydrogenated sugars (such as erythritol, arabitol, xylitol, sorbitol, talitol, mannitol, iditol, maltitol, isomaltitol, lactitol, cellobitol, palatinitol, maltotriitol),
sorbitan and isosorbide,
butanediol and propanediol,
starch hydrolysates and hydrogenation products of a starch hydrolysate,
hemicellulose hydrolysates and hydrogenation products of a hemicellulose hydrolysate,
polyols obtained by functionalization of a vegetable oil,
sucrose,
reducing sugars such as glucose or fructose or a maltose, lactose or isomalt,
trimethylol propane, pentaerythritol, neopentyl glycol.

The polyol can be obtained by hydrogenation of carbohydrates of formula $C_n(H_2O)_p$, or reducing sugars, having at least one aldehyde or ketone group (reducing group). These products, also known as hydrogenated sugars or sugar alcohols, comprise all of the products resulting from the reduction of a saccharide chosen from monosaccharides, disaccharides, oligosaccharides and polysaccharides and mixtures of these products.

The polyol may be a product of hydrogenation of a starch hydrolysate or a hemicellulose hydrolysate. Starch and hemicellulose are polysaccharides. Starch hydrolysates and hemicellulose hydrolysates are products obtained by enzymatic and/or acid hydrolysis of starch or of hemicellulose.

For the starch hydrolysates, the degree of hydrolysis is generally characterized by the dextrose equivalent (DE), defined by the following relationship:

$$DE = 100 \times \frac{\text{(number of glycosidic bonds broken)}}{\text{(number of glycosidic bonds in the initial starch)}}$$

The preferred starch hydrolysates have, before the hydrogenation step, a DE of between 5 and 99, and advantageously between 10 and 80.

The hydrogenation of the saccharide can be carried out by known methods which operate under high hydrogen pressure and temperature conditions, in the presence of a catalyst chosen from the elements of groups IB, IIB, IVB, VI, VII and VIII of the periodic table of elements, preferably from the group comprising nickel, platinum, palladium, cobalt, molybdenum and mixtures thereof. The preferred catalyst is Raney nickel. The hydrogenation converts the sugar or the mixture of sugars (starch hydrolysate) into polyols or sugar alcohols.

Hemicelluloses comprise the following polysaccharides: xylan, glucuronoxylan, arabinoxylan, glucomannan and xyloglucan.

By way of example of aliphatic polyols chosen from hydrogenated sugars, mention may be made of erythritol, arabitol, xylitol, sorbitol, mannitol, iditol, maltitol, isomaltitol, lactitol, cellobitol, palatinitol, maltotritol, starch hydrolysate hydrogenation products and hemicellulose hydrolysate hydrogenation products.

The polyglycidyl ether of an aliphatic polyol may be chosen from:

a polyglycidyl ether of glycerol, a polyglycidyl ether of polyglycerol, a polyglycidyl ether of inositol, a polyglycidyl ether of erythritol, a polyglycidyl ether of arabitol, a polyglycidyl ether of xylitol, a polyglycidyl ether of talitol, a polyglycidyl ether of sorbitol, a polyglycidyl ether of mannitol, a polyglycidyl ether of iditol, a polyglycidyl ether of maltitol, a polyglycidyl ether of isomaltitol, a polyglycidyl ether of lactitol, a polyglycidyl ether of cellobitol, a polyglycidyl ether of palatinitol, a polyglycidyl ether of maltotriitol, a polyglycidyl ether of isosorbide, a polyglycidyl ether of sorbitan, a polyglycidyl ether of butanediol, a polyglycidyl ether of propanediol, a polyglycidyl ether of sucrose, a polyglycidyl ether of glucose, a polyglycidyl ether of fructose, a polyglycidyl ether of maltose, a polyglycidyl ether of lactose, a polyglycidyl ether of isomalt, a polyglycidyl ether of trimethylol propane, a polyglycidyl ether of pentaerythritol, and a polyglycidyl ether of neopentyl glycol.

The polyglycidyl ether of an aliphatic polyol may be chosen from a polyglycidyl ether of starch hydrolysate hydrogenation products or hemicellulose hydrolysate hydrogenation products.

The polyol can be obtained by functionalization of a vegetable oil. The vegetable oils are composed in a large part of triglycerides in which the three hydroxyl groups of the glycerol are esterified with fatty acids. The fatty acids may be unsaturated and/or may comprise hydroxyl functions.

To obtain a polyol from a vegetable oil, it is for example possible to carry out the epoxidation followed by the hydrolysis of at least two double bonds of an unsaturated fatty acid.

Another possibility consists in using a vegetable oil comprising fatty acids comprising an alcohol function and at least one double bond. The polyol is obtained by carrying out the epoxidation followed by the hydrolysis of at least one double bond.

The polyglycidyl ether of an aliphatic polyol may be chosen from a polyglycidyl ether of a polyol obtained by functionalization of a vegetable oil.

The epoxy precursor comprising at least two epoxy functions may be chosen from an aliphatic polyepoxy compound obtained by oxidation, of double bond epoxidation type, of a compound comprising at least two double bonds. The compound comprising at least two double bonds may be chosen from a fatty acid, a fatty acid ester, a furan or a terpene.

The method most commonly employed for epoxidizing a double bond uses peracetic acid formed in situ by reaction between acetic acid and hydrogen peroxide.

The aliphatic polyepoxy compound obtained by oxidation of a double bond can be obtained by oxidation of a compound chosen from a furan, a terpene or an unsaturated vegetable oil.

The aqueous binding compound comprises at least one hardener chosen from compounds comprising at least two reactive functions chosen from hydroxyl and carboxylic acid functions.

The hardener is preferably biobased.

Preferably, the binding compound comprises a hardener having a molar mass of less than or equal to 1000, preferably less than or equal to 750 and advantageously less than or equal to 500 g/mol.

The hardener may be chosen from:

a polyol, a polycarboxylic acid.

The hardener may comprise at least one polycarboxylic acid, or a salt or anhydride of such an acid.

The hardener is chosen from organic polycarboxylic acids, and the salts or anhydrides of these acids. The term "organic polycarboxylic acid" is intended to mean an organic acid comprising at least two carboxylic functions, preferably at most 15 carboxylic functions. The organic polycarboxylic acid may be a saturated or unsaturated, branched or linear, nonpolymeric or polymeric acid which is noncyclic, alicyclic acid or aromatic. It has an average molar mass in general of less than or equal to 50 000, preferably less than or equal to 10 000 and advantageously less than or equal to 5000.

The nonpolymeric or monomeric polycarboxylic acid may be a dicarboxylic or tricarboxylic or tetracarboxylic acid.

The preferred dicarboxylic acids encompass, for example, 2,5-furandicarboxylic acid, oxalic acid, malonic acid, succinic acid, glutaric acid, malic acid, tartaric acid, tartronic acid, aspartic acid, glutamic acid, fumaric acid, itaconic acid, maleic acid, traumatic acid, mesaconic acid and citraconic acid.

Other dicarboxylic acids that may optionally be used encompass adipic acid, pimelic acid, suberic acid, azelaic acid, sebacic acid, phthalic acid and its derivatives, in particular containing at least one boron or chlorine atom, tetrahydrophthalic acid and its derivatives, in particular containing at least one chlorine atom, such as chlorendic acid, isophthalic acid, terephthalic acid.

The tricarboxylic acids encompass, for example, citric acid, tricarballylic acid, 1,2,4-butanetricarboxylic acid, aconitic acid, hemimellitic acid, trimellitic acid and trimesic acid.

As tetracarboxylic acid, mention may for example be made of 1,2,3,4-butanetetracarboxylic acid and pyromellitic acid.

2,5-furandicarboxylic acid, itaconic acid, citric acid and 1,2,3,4-butanetetracarboxylic acid are preferably used.

By way of example of a polymeric organic polycarboxylic acid, mention may be made of:
homopolymers of an unsaturated carboxylic acid such as (meth)acrylic acid, crotonic acid, isocrotonic acid, maleic acid, cinnamic acid, 2-methylmaleic acid, fumaric acid, itaconic acid, 2-methylitaconic acid or α,β-methyleneglutaric acid, and
copolymers of at least one abovementioned unsaturated carboxylic acid.

The polycarboxylic acid is preferably chosen from citric acid, succinic acid, tartaric acid, maleic acid, itaconic acid, 1,2,3,4-butanetetracarboxylic acid, and homopolymers and copolymers of maleic acid, acrylic acid and itaconic acid.

The hardener may be an anhydride, in particular maleic anhydride, succinic anhydride or phthalic anhydride.

Preferably, the binding compound comprises, as hardener, at least one nonpolymeric organic polycarboxylic acid having a number-average molar mass of less than or equal to 1000, preferably less than or equal to 750 and advantageously less than or equal to 500 g/mol.

The aqueous binding compound comprising a hardener chosen from polycarboxylic acids has a pH of less than 7, preferably less than 5 or between 2 and 5.

The hardener may comprise a polyol. The polyols may comprise primary, secondary or tertiary alcohol functions or mixtures.

Preferably, the binding compound comprises, as hardener, at least one polyol having a molar mass of less than or equal to 1000, preferably less than or equal to 750 and advantageously less than or equal to 500 g/mol.

The polyol used as hardener may be chosen from aliphatic or aromatic compounds. Preferably, the polyol used as hardener is water-miscible or water-soluble.

The polyol may be chosen from sugars, in particular reducing sugars, nonreducing sugars, hydrogenated sugars and mixtures thereof.

The polyol may be chosen form linear, cyclic or branched monosaccharides and oligosaccharides.

Preferably, the polyol is chosen form:
glycerol,
polyglycerols,
inositol,
hydrogenated sugars (such as erythritol, arabitol, xylitol, sorbitol, talitol, mannitol, iditol, maltitol, isomaltitol, lactitol, cellobitol, palatinitol, maltotriitol),
sorbitan and isosorbide,
butanediol and propanediol,
the product of hydrogenation of a starch hydrolysate, the product of hydrogenation of a hemicellulose hydrolysate or polyols obtained by functionalization of a vegetable oil,
sucrose,
reducing sugars such as glucose, fructose, maltose, lactose or isomalt,
trimethylol propane, pentaerythritol, neopentyl glycol.

Preferably, the hardener comprises at least one polyol chosen from sucrose, glucose, fructose, lactose, isomalt, isosorbide or talitol, sorbitan, inositol, glycerol, erythritol, arabitol, xylitol, sorbitol, mannitol, iditol, maltitol, isomaltitol, lactitol, cellobitol, palatinitol, maltotriitol, starch hydrolysate hydrogenation products, trimethylol propane and pentaerythritol.

The polyol may also be chosen from polyphenols of natural origin. In this case, the hardener may comprise a polyol chosen from lignin and its derivatives, lignans, ammonium lignosulfonate or the alkali or alkaline-earth metal salts of lignosulfonic acid, tannic acids, tannins and condensed tannins.

Ammonium lignosulfonate is a by-product resulting from wood treatment for the manufacture of paper pulp according to the "sulfite" process. The treatment of the paper pulp with ammonium sulfite or ammonium bisulfite makes it possible to obtain ammonium lignosulfonates.

Ammonium ligosulfonate also makes it possible to confer good fire resistance on the binding compound.

The alkali or alkaline-earth metal salts of lignosulfonic acid are generally complex mixtures of several lignosulfonic acids in salified form, commonly known as "lignosulfonates". Lignosulfonates are by-products resulting from wood treatment for the manufacture of paper pulp according to the "sulfite" process mentioned above which uses a sulfite or a bisulfite. Depending on the nature of the counterion of the sulfite of the bisulfite employed, alkali or alkaline-earth metal salts of lignosulfonic acid are in particular obtained. In the present invention, the preferred alkali metal salts of lignosulfonic acid are sodium lignosulfonate or potassium lignosulfonate, advantageously sodium lignosulfonate, and the preferred alkaline-earth metal salts of lignosulfonic acid are magnesium lignosulfonate or calcium lignosulfonate.

The polyol may also be chosen from polyhydroxylated natural polymers such as xanthan gum, pectin, chitosan, starch or hyaluronic acid.

The aqueous binding compound comprising a hardener chosen from polyols has a pH:
greater than 4, preferably greater than 5 or
between 4 and 12, preferably between 5 and 9.

The composition may comprise, in addition to the components a) and b), a catalyst and/or conventional additives.

The binding compound may also comprise a catalyst. The function of the catalyst is to adjust the crosslinking profile. It makes it possible for example to increase the crosslinking rate or to reduce the crosslinking temperature.

The catalyst may be chosen from Lewis bases and acids. The catalyst may be organic or inorganic in nature.

Preferably, a catalyst is used when the hardener is a polyol. In this case, the catalyst may be a basic organic compound such as an amine, an amine salt, a quaternary ammonium or a phosphorus-comprising compound.

The catalyst may be chosen from imidazoles, imidazolines and mixtures thereof. By way of examples of imidazoles, mention may be made of imidazole, 1-methyl imidazole, 2-methylimidazole, 2-phenylimidazole, 2-ethyl-4-methylimidazole and 4,4'-methylenebis(2-ethyl-5-methylimidazole). By way of example of an imidazoline, mention may be made of 2-ethyl-N-phenylimidazoline. 2-methylimidazole is preferably used.

The catalyst may be chosen from metal salts such as zinc salts.

The sum of the proportions by weight of the epoxy precursor (a) and of hardener (b) represents, by weight of the solids of the binding compound, in increasing order of preference, at least 50%, at least 60%, at least 70%, at least 80%, at least 90%, at least 95% by weight of the solids of the binding compound.

The binding compound comprises, in increasing order of preference, for one part by weight of hardener (b), 0.5 to 50 parts, 0.5 to 20 parts, 1.0 to 15 parts by weight of epoxy precursor (a).

The binding compound comprises, in increasing order of preference, for 100 parts by weight of epoxy precursor (a) and of hardener (b), 0.1 to 5 parts, 0.5 to 3 parts, 0.5 to 2 parts by weight of catalyst.

The binding compound may comprise, relative to the weight of the epoxy precursor (a) and of hardener (b):
- 10 to 90% or 20 to 80% or 30 to 70% or 40 to 60% by weight of epoxy precursor (a), and
- 10 to 90% or 20 to 80% or 30 to 70% or 40 to 60% by weight of hardener (b).

The binding compound in accordance with the invention may also comprise conventional additives. These additives below are in the following proportions calculated on the basis of 100 parts by weight of epoxy precursor (a) and of hardener (b):
- from 0 to 5 parts of silane,
- from 0 to 40 parts, preferably from 4 to 25 parts, of an oil or oil emulsion,
- from 0 to 5 parts of a hydrophobic agent, in particular a silicone,
- from 0 to 20 parts of urea, preferably 0 to 10 and better still from 0 to 5 parts,
- from 0 to 40 parts, preferably 0 to 20 parts, of an extending filler.

The binding compound in accordance with the invention may consist of water, of the epoxy precursor chosen from aliphatic compounds (a), of the hardener (b), optionally the catalyst and of the conventional additives.

The aqueous binding compound comprises at least 40%, preferably at least 50% by weight of water relative to the total weight of the aqueous binding compound.

The role of the additives is known and briefly summarized. Silane is an agent for coupling between the fibers and the binder, which also acts as an anti-ageing agent. The oils are anti-dusting agents and hydrophobic agents. The urea acts as a plasticizer. The extending filler is an organic or inorganic filler which is soluble or dispersible in the binding compound and which makes it possible in particular to reduce the cost thereof.

The hydrophobic agent is preferably a reactive silicone. The term "reactive silicone" is intended to mean a polyorganosiloxane bearing at least one hydroxyl (silanol), carboxyl or anhydride, amine, epoxy or vinyl function capable of reacting with at least one of the constituents of the binding compound and/or with the silanol groups of the surface of the glass.

The reactive silicone is preferably liquid at ambient temperature. Its average molar mass is generally less than or equal to 50 000, preferably less than or equal to 10 000. The reactive silicone consists of a main chain composed of organosiloxane, in particular alkylsiloxane, preferably dimethylsiloxane, residues and optionally of phenylsiloxane, in particular methylphenylsiloxane, residues in a proportion preferably not exceeding 20%, in particular no more than 10% by weight of phenylsiloxane units relative to the weight of the silicone. Said main chain bears at least one hydroxyl, carboxyl or anhydride, amine, epoxy or vinyl reactive function in the terminal position (on one of the free ends of the chain) or on a pendent group (or graft). Preferably, the reactive silicone comprises at least two terminal functions, advantageously hydroxyl functions.

Preferably, the reactive silicone comprises a reactive function, advantageously a silanol function, at each of its chain ends.

The reactive function of the reactive silicone may be blocked with a protective group which releases said reactive function under the effect of heat. The proportion of reactive silicone in the binding compound generally ranges from 0.1 to 5 parts, preferably from 0.3 to 3 parts, advantageously from 0.5 to 2.5 parts and even better still from 0.7 to 1.8 parts by weight, per 100 parts by weight of the sum of the components (a) and (b).

The preparation of the binding compound is carried by simply mixing the abovementioned constituents with water.

The binding compound is intended to be applied to mineral fibers, in particular glass or rock fibers.

A subject of the present invention is also a process for manufacturing an insulation product. According to one embodiment, the insulation product is in the form of mineral wool. The process also comprises the steps wherein:
- mineral fibers are formed from a composition of molten mineral matter, then
- an aqueous binding compound is applied to the mineral fibers, then
- the fibers are collected in the form of a web, then
- the web is subjected to a heat treatment at a temperature of greater than 150° C., preferably from 180 to 220° C. so as to form a binder by thermal curing of the nonvolatile components of the binding compound.

Conventionally, the binding compound is projected by spraying onto the mineral fibers in the fiber collection hopper which is at the outlet of the centrifugal device and before the receiving member for collecting the fibers on in the form of a web of fibers which is subsequently treated at a temperature which makes possible the crosslinking of the binding compound and the formation of an infusible binder.

In one embodiment, the process of the present invention consequently comprises a step of preparing the aqueous binding compound, which comprises mixing the precursor, the hardener, catalyst and the optional additives before the step of applying to the fibers.

The binding compound has a pot life of at least greater than 5 minutes, preferably greater than one hour, better still of a few hours to a few days.

The binding compound is free of formaldehyde and/or of bisphenol, in particular of bisphenol A.

The binder obtained by curing the binding compound is an epoxy resin. These epoxy resins have a glass transition temperature that can be between 0 and 150° C.

The insulation products obtained by means of the process according to the invention from these bound fibers also constitute a subject of the present invention.

The insulation products may be acoustic and/or thermal insulation products.

The mineral fibers are chosen from glass fibers or rock fibers.

The mineral fibers and the binder represent, in increasing order of preference, at least 95%, at least 98%, at least 99%, by weight of the weight of the insulation product.

The mineral fibers and the binder may be in the form of mineral wool. In this case, the insulation products are in the form of mineral wool. They are generally in the form of a mat, a web or a felt of mineral, glass or rock wool.

The total weight of binder represents 0.5 to 15% of the total weight of the mineral fibers, preferably 1 to 12% and better still 2 to 6%.

The mineral fibers and the binder may be in the form of a net comprising bound mineral fibers. In this case, the insulation products are in the form of a net of mineral fibers, also glass or rock fibers.

The net may also be intended to form a surface coating of said mat, web or felt.

EXAMPLES

The compounds used to prepare the binding compounds are listed in the table below.

| Compounds | Nature | Name |
|---|---|---|
| Precursor | Polyglycidyl ether of glycerol | PGG |
|  | Polyglycidyl ether of isosorbide | PGI |
| Hardener | Polyacid: citric acid | CA |
|  | Polyol: sucrose | SU |
|  | Polyol: sorbitol | SO |
|  | Polyol: maltitol | MA |
|  | Polyol: erythritol | ER |
|  | Polyol: trimethylol propane | TR |
|  | Polyamine: tetraethylenetetramine | TETA |
|  | Polyamine: cycloaliphatic polyamine | DEH 2132 |
|  | Amino acid: lysine | LYS |
| Catalyst | Amine: 2-methylimidazole | Cat |

Binding Compounds

The binding compounds are prepared by introducing water, the precursor, the hardener and optionally the catalyst into a container, with vigorous stirring until a homogeneous solution is obtained.

The binding compounds tested and the properties thereof are summarized in the table below. The proportions indicated are expressed in parts by weight.

Determination of the Storage Stability or "Pot Life"

The binding compounds having a solids content of 30% are stored in 250 ml glass jars at a temperature of 25° C.

The storage stability is determined by evaluating the period of time after which a gel forms.

Determination of the Crosslinking Temperatures

A 55 mm×6 mm rectangle cut from a filter of non-bound glass microfibers (Whatman, reference 1822-150) is impregnated with approximately 300 mg of each of these binding compounds.

These impregnated rectangles are introduced into a dynamic mechanical analysis device, and the temperature of the sample holder is gradually increased (4° C./minute) starting from 25° C. up to 250° C., while continually measuring the storage modulus (E') in three-point bending (frequency of 1 Hz, strain of 0.1%).

Abbreviations Used

SC: solids content of the composition.

EP/H: weight ratio of the epoxy precursor to the hardener.

Cat.: % by weight of catalyst relative to the weight of precursor (a) and of hardener (b).

Formation of a gel: "pot life", period of time starting from which a gel forms.

CT: crosslinking temperature in ° C.

Tg: glass transition temperature in ° C. measured by DSC (differential scanning calorimetry) with a gradient of 2° C./min.

Vis: viscosity in Pa·s measured using a Brookfield viscometer at 20° C. on binding compounds having a solids content of 70%.

|  |  | SC (%) | EP/H | Cat. % | CT | Tg | Vis. | pH | Formation of a gel |
|---|---|---|---|---|---|---|---|---|---|
| Comp. ex. 1 | PGI/TETA | 30 | 6.5/1 | 0 | 50 | 76 | — | — | Less than 1 h |
| Comp. ex. 2 | PGI/DEH | 30 | 1.6/1 | 0 | 84 | 42.7 | — | 12 | Less than 1 h |
| Comp. ex. 3 | PGI/LYS | 30 | 5.4/1 | 0 | 35 | 44 | — | 7 | Less than 1 h |
| Comp. ex. 4 | PGG/TETA | 30 | 5.8/1 | 0 | 50 | 54 | — | — | Less than 1 h |
| Comp. ex. 5 | PGG/DEH | 30 | 1.4/1 | 0 | 20 | 53 | — | 11 | Less than 1 h |
| Ex. 1 | PGI/CA | 30 | 1.4/1 | 0 | 105 | 90 | 0.12 | <3 | >1 week |
| Ex. 2 | PGI/MA/Cat | 30 | 4/1 | 1 | 135 | 65 | 0.04 | 9 | >1 day |
| Ex. 3 | PGI/SO/Cat | 30 | 10/1 | 1 | 125 | 53 | 0.03 | 9 | >1 day |
| Ex. 4 | PGI/SA/Cat | 30 | 3.6/1 | 1 | 130 | 58 | 0.04 | 9 | >1 day |
| Ex. 5 | PGI/ER/Cat | 30 | 30/1 | 1 | 125 | 60 | — | 9 | >1 day |
| Ex. 6 | PGI/TR/Cat | 30 | 10/1 | 1 | 125 | 37 | — | 9 | >1 day |
| Ex. 7 | PGI/TR/Cat | 30 | 30/1 | 1 | 125 | 30 | — | 9 | >1 day |
| Ex. 8 | PGG/CA | 30 | 0.9/1 | 0 | 175 | 96 | 0.12 | <3 | >1 week |
| Ex. 9 | PGG/MA | 30 | 1.5/1 | 5 | 95 | 36 | 0.08 | 9 | >1 day |
| Ex. 10 | PGG/SO | 30 | 4.7/1 | 5 | 100 | 23 | 0.03 | 9 | >1 day |

The comparative examples show that the epoxidized aliphatic precursors react with the polyamine hardeners at temperatures below 90° C. Their use is therefore incompatible with the intended applications.

The binding compounds according to the invention advantageously have a crosslinking temperature of greater than 90°, or even greater than 100° C. and less than 200° C. Such temperatures are:

- sufficiently high to avoid any risk of pre-crosslinking or gelling before injection and
- sufficiently low for the energy cost of the step of curing the binding compound to be moderate, or even low.

This results in temperatures of less than 200° C., or even less than 150° C. and rapid crosslinking rates.

The binding compounds have a low viscosity regardless of the nature of the hardener.

The binding compounds comprising a hardener of polyol type all have a basic to neutral pH (Ex. 3 to 6).

Insulation Products

The binding compounds were then evaluated as binder on woven glass fiber textiles. The textile is impregnated with binding compound and crosslinking in a ventilated oven for two minutes at 215° C. These tests prove that the binding compositions produced are satisfactory for binding glass fiber-based composites.

The breaking strengths of the woven textiles thus coated before and after ageing were determined. This test consists in measuring the force at break of a binder-impregnated glass net. The results are reported in the table below. It emerges that the mechanical properties are sufficient. The insulation products based on mineral fibers bound by a binder resulting from the crosslinking of the binding compounds according to the invention are satisfactory.

|  | Fmax before ageing (N) | Fmax after ageing (N) |
| --- | --- | --- |
| Ex. 8: PGG/CA | 47 | 40 |
| Ex. 1: PGI/CA | 50 | 35 |
| Ex. 4: PGI/SU | 45 | 33 |
| Ex. 3: PGI/SO | 44 | 54 |

The invention claimed is:

1. An insulation product comprising mineral fibers and a binder obtained by curing a binding compound comprising as components:
   a) compounds comprising at least one epoxy function, including at least one epoxy precursor chosen from aliphatic compounds comprising at least two epoxy functions, the aliphatic compounds comprising at least two epoxy functions representing at least 50% of the total weight of the compounds comprising at least one epoxy function of the binding compound,
   b) a hardener selected from the group consisting of one or more compounds comprising at least two reactive hydroxyl functions,
      the one or more compounds being at least one polyol chosen from sucrose, glucose, fructose, lactose, isomalt, isosorbide or talitol, sorbitan, inositol, glycerol, erythritol, arabitol, xylitol, sorbitol, mannitol, iditol, maltitol, isomaltitol, lactitol, cellobitol, palatinitol, maltotritol, starch hydrolysate hydrogenation products or hemicellulose hydrolysate hydrogenation products, trimethylol propane and pentaerythritol, lignin and its derivatives, lignans, ammonium lignosulfate or the alkali or alkaline-earth metal salts of lignosulfonic acid, tannic acids, tannins and condensed tannins,
   and
   wherein the total weight of binder represents 0.5 to 15% of the total weight of the mineral fibers,
   wherein the binding compound comprises 0.5 to 50 parts by weight of epoxy precursor (a) for one part by weight of hardener (b).

2. The insulation product as claimed in claim 1, wherein the mineral fibers are chosen from glass fibers or rock fibers.

3. The insulation product as claimed in claim 1, wherein the mineral fibers and the binder represent at least 95% by weight of the weight of the insulation product.

4. The insulation product as claimed in claim 1, wherein the insulating product is in the form of mineral wool.

5. The insulation product as claimed in claim 1, wherein the aliphatic compound comprising at least two epoxy functions is chosen from:
   a polyglycidyl ether of an aliphatic polyol, and
   an aliphatic polyepoxy compound obtained by oxidation of a compound comprising at least two double bonds.

6. The insulation product as claimed in claim 5, wherein the polyglycidyl ether of an aliphatic polyol is chosen from:
   a polyglycidyl ether of glycerol, a polyglycidyl ether of polyglycerol, a polyglycidyl ether of inositol, a polyglycidyl ether of erythritol, a polyglycidyl ether of arabitol, a polyglycidyl ether of xylitol, a polyglycidyl ether of talitol, a polyglycidyl ether of sorbitol, a polyglycidyl ether of mannitol, a polyglycidyl ether of iditol, a polyglycidyl ether of maltitol, a polyglycidyl ether of isomaltitol, a polyglycidyl ether of lactitol, a polyglycidyl ether of cellobitol, a polyglycidyl ether of palatinitol, a polyglycidyl ether of maltotritol, a polyglycidyl ether of isosorbide, a polyglycidyl ether of sorbitan, a polyglycidyl ether of butanediol, a polyglycidyl ether of propanediol, a polyglycidyl ether of sucrose, a polyglycidyl ether of glucose, a polyglycidyl ether of fructose, a polyglycidyl ether of maltose, a polyglycidyl ether of lactose, a polyglycidyl ether of isomalt, a polyglycidyl ether of trimethylol propane, a polyglycidyl ether of pentaerythritol, and a polyglycidyl ether of neopentyl glycol,
   a polyglycidyl ether of a polyol obtained by functionalization of a vegetable oil, and
   a polyglycidyl ether of starch hydrolysate hydrogenation products or hemicellulose hydrolysate hydrogenation products.

7. The insulation product as claimed in claim 5, wherein the aliphatic polyepoxy compound obtained by oxidation of a double bond is obtained by oxidation of a compound chosen from a furan, a terpene or an unsaturated vegetable oil.

8. The insulation product as claimed in claim 1, wherein the binding compound also comprises a catalyst and/or additives.

9. The insulation product as claimed in claim 1, wherein the sum of the proportions by weight of the epoxy precursor (a) and of hardener (b) represents at least 50% by weight of the solids of the binding compound.

10. An aqueous binding compound for insulation products based on mineral fibers, comprising as components:
    a) compounds comprising at least one epoxy function, including at least one epoxy precursor chosen from aliphatic compounds comprising at least two epoxy functions, the aliphatic compounds comprising at least two epoxy functions representing at least 50% of the total weight of the compounds comprising at least one epoxy function of the binding compound,
    b) a hardener that reacts with said compounds to crosslink the aqueous binding compound, the hardener being selected from the group consisting of one or more compounds comprising at least two reactive hydroxyl functions,
       the one or more compounds being
          at least one polyol chosen from sucrose, glucose, fructose, lactose, isomalt, isosorbide or talitol, sorbitan, inositol, glycerol, erythritol, arabitol, xylitol, sorbitol, mannitol, iditol, maltitol, isomaltitol, lactitol, cellobitol, palatinitol, maltotritol, starch hydrolysate hydrogenation products or hemicellulose hydrolysate hydrogenation products, trimethylol propane and pentaerythritol, lignin and its derivatives, lignans, ammonium lignosulfate or the alkali or alkaline-earth metal salts of lignosulfonic acid, tannic acids, tannins and condensed tannins,
       wherein the binding compound comprises 0.5 to 50 parts by weight of epoxy precursor (a) for one part by weight of hardener (b).

11. The aqueous binding compound as claimed in claim 10, wherein the epoxy precursor is water-soluble or water-miscible.

12. The aqueous binding compound as claimed in claim 10, wherein the components (a) and (b) have a crosslinking temperature determined by dynamic mechanical analysis with a heating rate of 4° C./min of greater than or equal to 90° C.

13. A process for manufacturing an insulation product comprising mineral fibers and a binder, the process comprising:

applying an aqueous binding compound as claimed in claim 10 to the mineral fibers, and forming a binder by thermal curing of the nonvolatile components of the binding compound.

14. A process for manufacturing an insulation product as claimed in claim 1, the insulation product being in the form of mineral wool, the process also comprising:

forming mineral fibers from a composition of molten mineral matter, then applying an aqueous binding compound to the mineral fibers, then collecting the fibers in the form of a web, and then subjecting the web to a heat treatment at a temperature of greater than 150° C. so as to form a binder by thermal curing of the nonvolatile components of the binding compound.

\* \* \* \* \*